US009162692B2

(12) United States Patent
Rice

(10) Patent No.: US 9,162,692 B2
(45) Date of Patent: Oct. 20, 2015

(54) GAME CART DEVICE

(71) Applicant: Ernest A. Rice, Kendallville, IN (US)

(72) Inventor: Ernest A. Rice, Kendallville, IN (US)

( * ) Notice: Subject to any disclaimer, the term of this patent is extended or adjusted under 35 U.S.C. 154(b) by 0 days.

(21) Appl. No.: 14/462,914

(22) Filed: Aug. 19, 2014

(65) Prior Publication Data

US 2015/0054236 A1    Feb. 26, 2015

Related U.S. Application Data

(60) Provisional application No. 61/868,647, filed on Aug. 22, 2013.

(51) Int. Cl.
*B62B 1/12* (2006.01)
*A47C 13/00* (2006.01)
*A01M 31/00* (2006.01)

(52) U.S. Cl.
CPC ............... *B62B 1/12* (2013.01); *A01M 31/006* (2013.01); *A47C 13/00* (2013.01); *B62B 2206/006* (2013.01)

(58) Field of Classification Search
CPC ....... A47C 13/00; A01M 31/006; B62B 1/12; B62B 2206/00; B62B 2206/006; B62B 13/00; A22B 7/006

USPC ............ 280/30, 651, 652, 47.18, 35, 47.131, 280/47.24, 47.25, 47.17; 42/94
See application file for complete search history.

(56) References Cited

U.S. PATENT DOCUMENTS

| | | | | |
|---|---|---|---|---|
| 5,330,212 A * | 7/1994 | Gardner | ...... | 280/40 |
| 5,433,291 A * | 7/1995 | Shoestock, Sr. | ...... | 182/20 |
| 5,492,196 A * | 2/1996 | Michno | ...... | 182/20 |
| 6,217,043 B1 * | 4/2001 | Chumley | ...... | 280/40 |
| 6,516,919 B1 * | 2/2003 | Sempel | ...... | 182/20 |
| 6,811,179 B2 * | 11/2004 | Woods | ...... | 280/652 |
| 6,811,180 B1 * | 11/2004 | Molliere | ...... | 280/652 |
| 2007/0194560 A1 * | 8/2007 | Zink | ...... | 280/652 |

* cited by examiner

*Primary Examiner* — John Walters
*Assistant Examiner* — Brian Swenson
(74) *Attorney, Agent, or Firm* — Taylor IP, P.C.

(57) ABSTRACT

A convertible game cart including a first wheel rotatable about a first axis, a second wheel rotatable about a second axis, and a pivoting mechanism. The pivoting mechanism couples the first wheel and the second wheel. The pivoting mechanism is configured to pivot the first wheel relative to the second wheel from a first orientation with the first axis and the second axis being generally parallel to a second orientation with the first axis and the second axis being generally perpendicular.

19 Claims, 7 Drawing Sheets

GAME CART DEVICE

This is a non-provisional application based upon U.S. provisional patent application Ser. No. 61/868,647 entitled "GAME CART DEVICE", filed Aug. 22, 2013, which is incorporated herein by reference.

BACKGROUND OF THE INVENTION

1. Field of the Invention

The present invention relates to carts, and, more particularly, to a dual use game cart.

2. Description of the Related Art

Hunting wild game involves skill and a great deal of time in the outdoors. Part of the process requires the transportation of hunting and support gear to the hunting area, and ensuring that there is a comfortable place to sit. Once the prey, in the form of a large game animal is killed, after field dressing, the hunter must transport the animal back to a vehicle or preferably retrieval of a game cart to transport the animal. The first option may be accomplished by dragging or carrying the animal, which requires a great deal of effort while the second may require twice the travel distance if the cart is with the vehicle. Also, reacquiring the location of the carcass, left while retrieving a cart, can result in reduced carcass value.

The game carts commercially available today, are generally single purpose devices normally left in with the hunter's vehicle until needed. Over the years various carts have been developed in order to assist the successful hunter in transporting his take through various types of wilderness. One of the more successful solutions to this problem has been the use of carts specifically designed to carry a large animal carcass.

A problem with prior art carts is that they perform a single purpose and are just used at the end of the hunt for the transport of the game.

What is needed in the art is a multipurpose game cart.

SUMMARY OF THE INVENTION

The present invention is directed to a game cart in the form of a dual purpose game cart convertible to a pivoting seat.

The present invention consists in one form thereof of a convertible game cart including a first wheel rotatable about a first axis, a second wheel rotatable about a second axis, and a pivoting mechanism. The pivoting mechanism couples the first wheel and the second wheel. The pivoting mechanism is configured to pivot the first wheel relative to the second wheel from a first orientation with the first axis and the second axis being generally parallel to a second orientation with the first axis and the second axis being generally perpendicular.

The present invention consists in another form thereof of a combination cart and hunting seat, including a first wheel rotatable about a first axis, a second wheel rotatable about a second axis, and a pivoting seat supporting mechanism. The pivoting seat supporting mechanism coupling the first wheel with the second wheel. The pivoting seat supporting mechanism is configured to pivot the first wheel relative to the second wheel from a first orientation with the first axis and the second axis being generally parallel to a second orientation with the first axis and the second axis being generally perpendicular.

An advantage of the present invention is that it provides another function for the cart mechanism.

Another advantage of the present invention is that the seat is rotatable.

Yet another advantage of the present invention is that one wheel is supported by the other to give a smooth quiet movement.

Yet another advantage of the present invention is that the platform of the cart can be folded to provide a seat for the hunter.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment, in one form, of the invention, and such exemplification is not to be construed as limiting the scope of the invention in any manner.

DETAILED DESCRIPTION OF THE INVENTION

Figure 1:
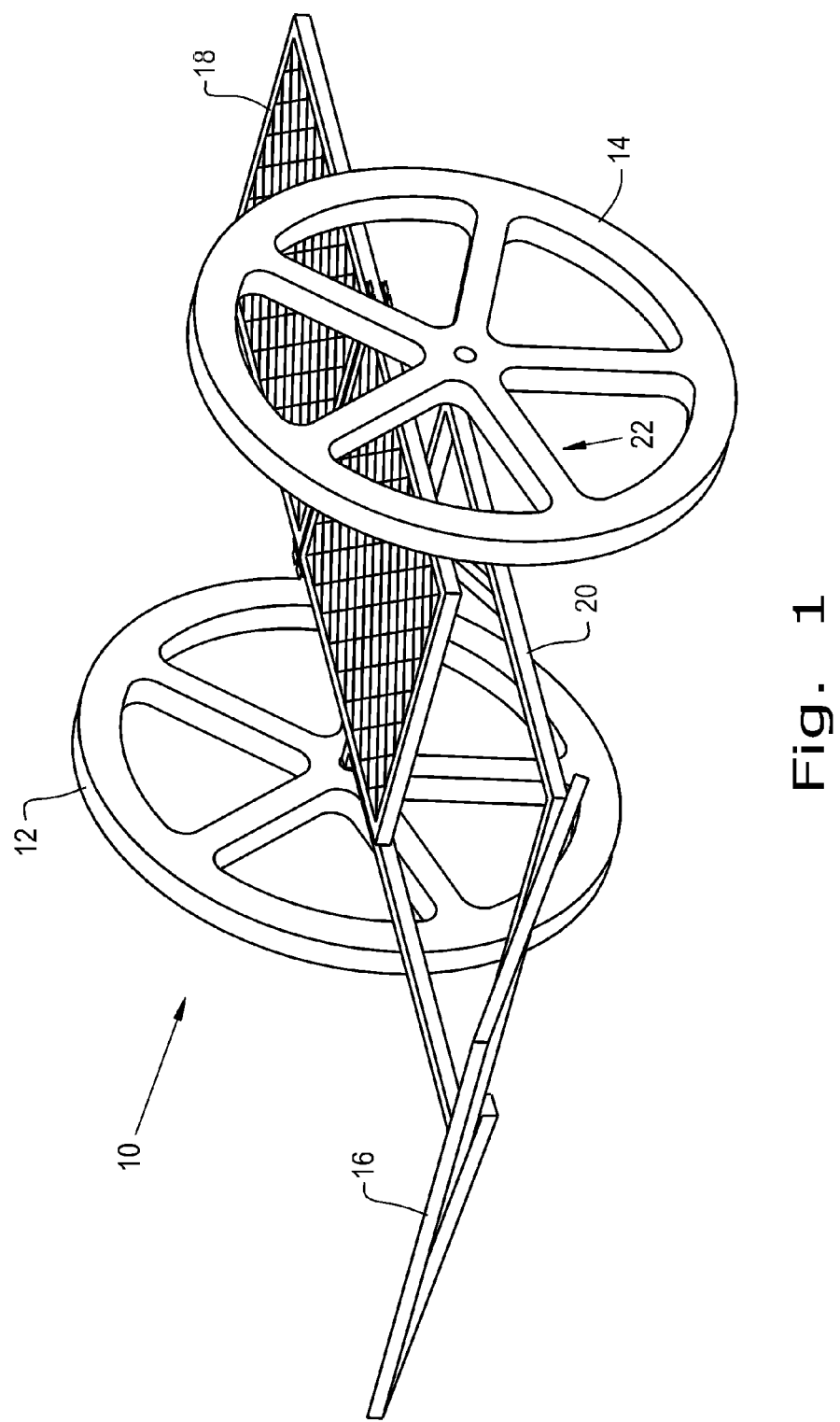
FIG. 1 is a perspective view of an embodiment of a game cart of the present invention.

Referring now to the drawings, and more particularly to FIGS. 1-7, there is shown a game cart and hunting seat combination, referred to as a game cart device 10. Game cart device 10 includes a wheel 12, a wheel 14, a handle 16, a bed/seat 18, a frame 20, an axle system 22, an axle member 24, axle member 26, a pivot point 28 and a shooting rest 30.

Game cart device 10 can be moved as a cart when configured as illustrated in FIG. 1. This configuration allows hunting gear to be transported to a hunting site and can be used to transport game out of the woods or rough terrain. While at the hunting site, combination device 10 is converted into a hunting seat 10.

Figure 2:
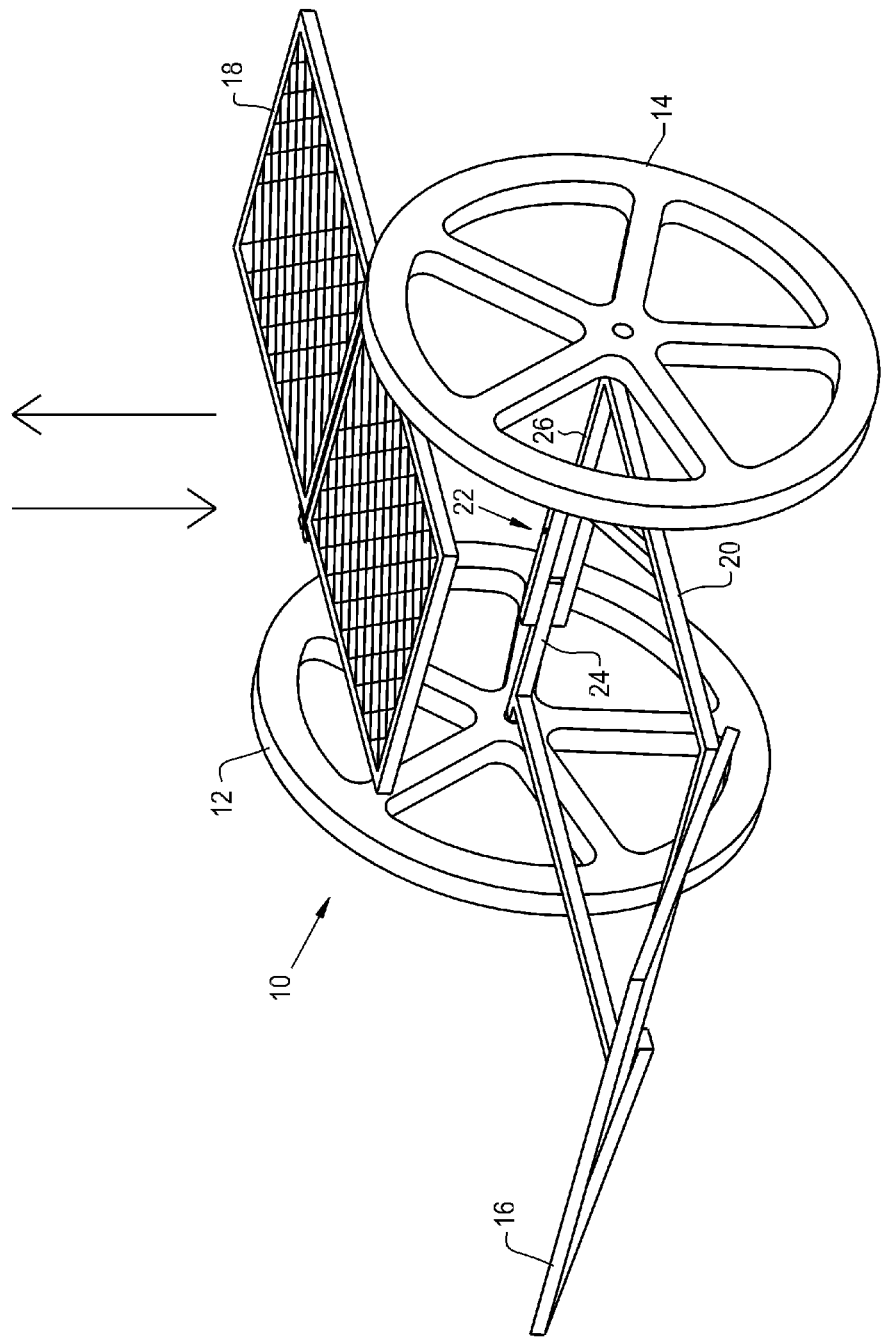
FIG. 2 is a partially exploded perspective view showing the removal of the cart platform of the game cart of FIG. 1.
Figure 3:
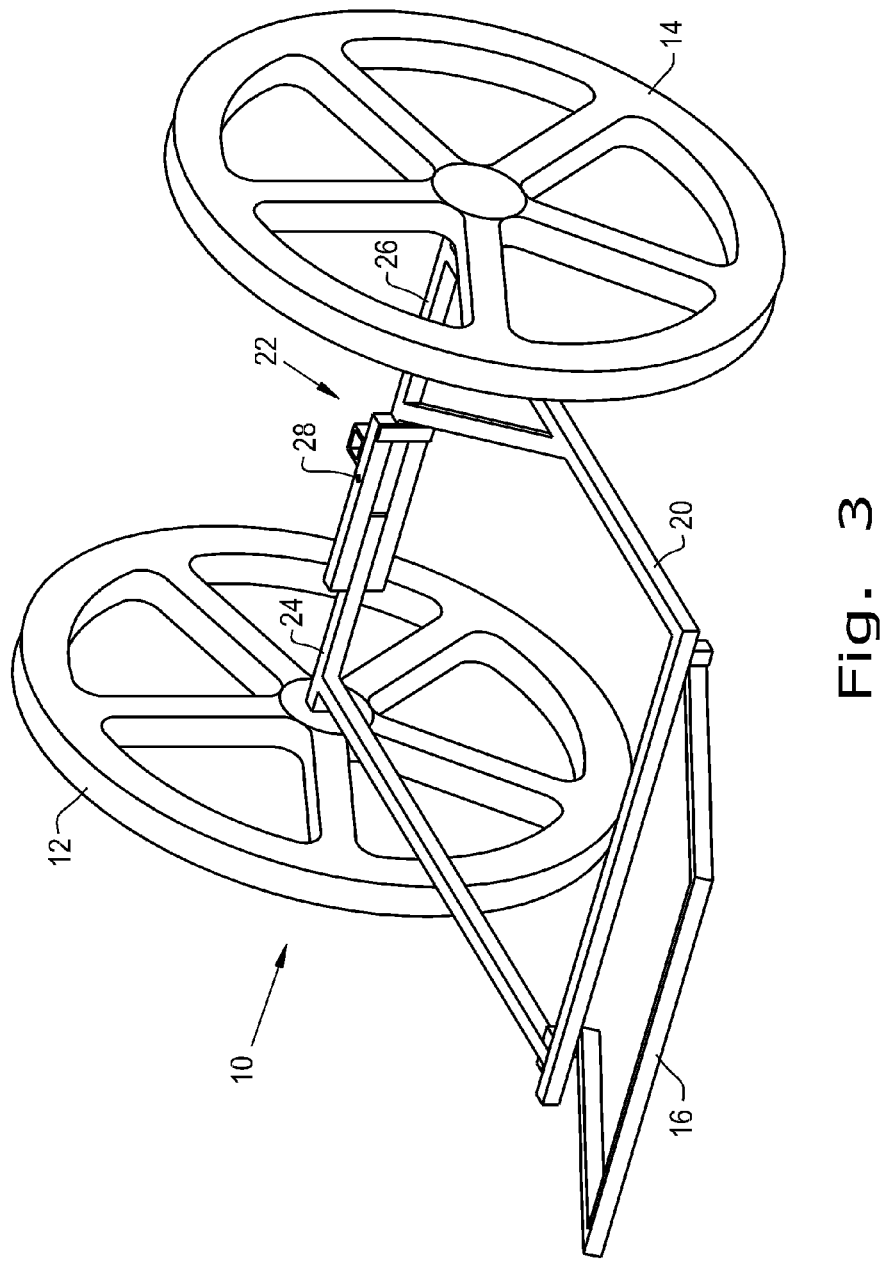
FIG. 3 is a perspective view of the game cart of FIGS. 1 and 2 illustrating a pivoting axle mechanism.
Figure 6:
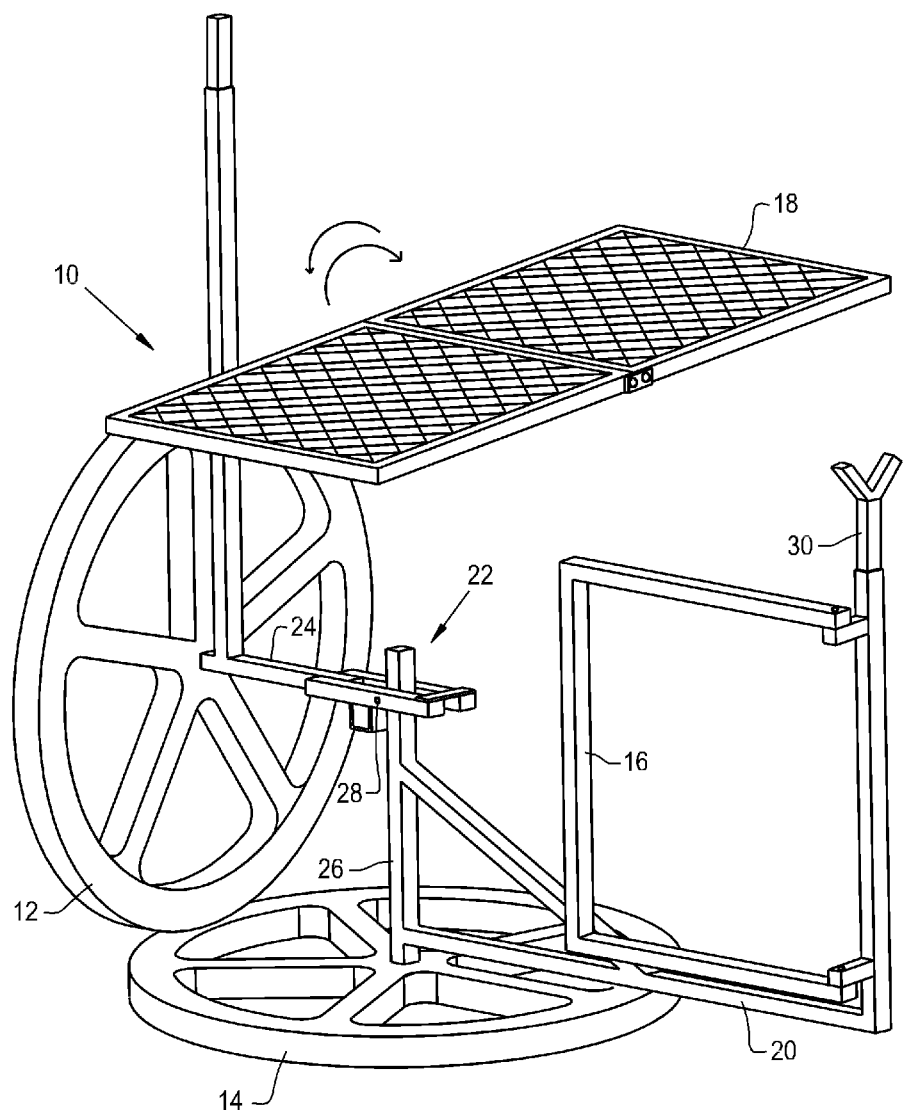
FIG. 6 is a perspective view of the game cart of FIGS. 1-5 in the process of being configured as a hunting seat.
Figure 7:
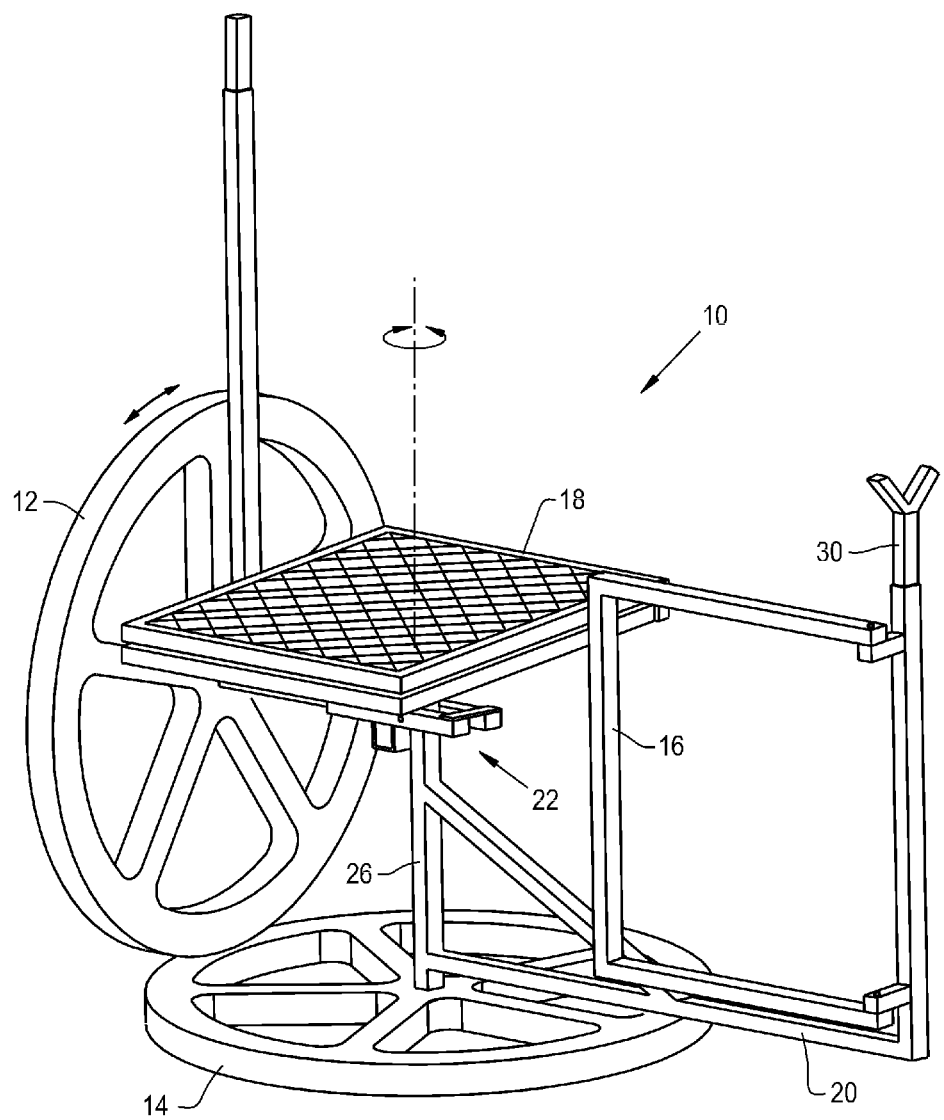
FIG. 7 is a perspective view of the game cart of FIGS. 1-6, now fully configured as a pivoting hunting seat.

FIG. 2 illustrates the removal of the cart bed/hunting seat 18 from frame 20. Bed/seat 18 may be folded as illustrated in FIGS. 6 and 7 to reduce the size of the cart bed to a more convenient seat size. FIG. 3 shows device 10 without bed/seat 18. Bed/seat 18 is a support mechanism 18, for supporting game and equipment when convertible device 10 is in the orientation as shown in FIG. 1, and for supporting the hunter when in the orientation as shown in FIG. 7.

Figure 4:
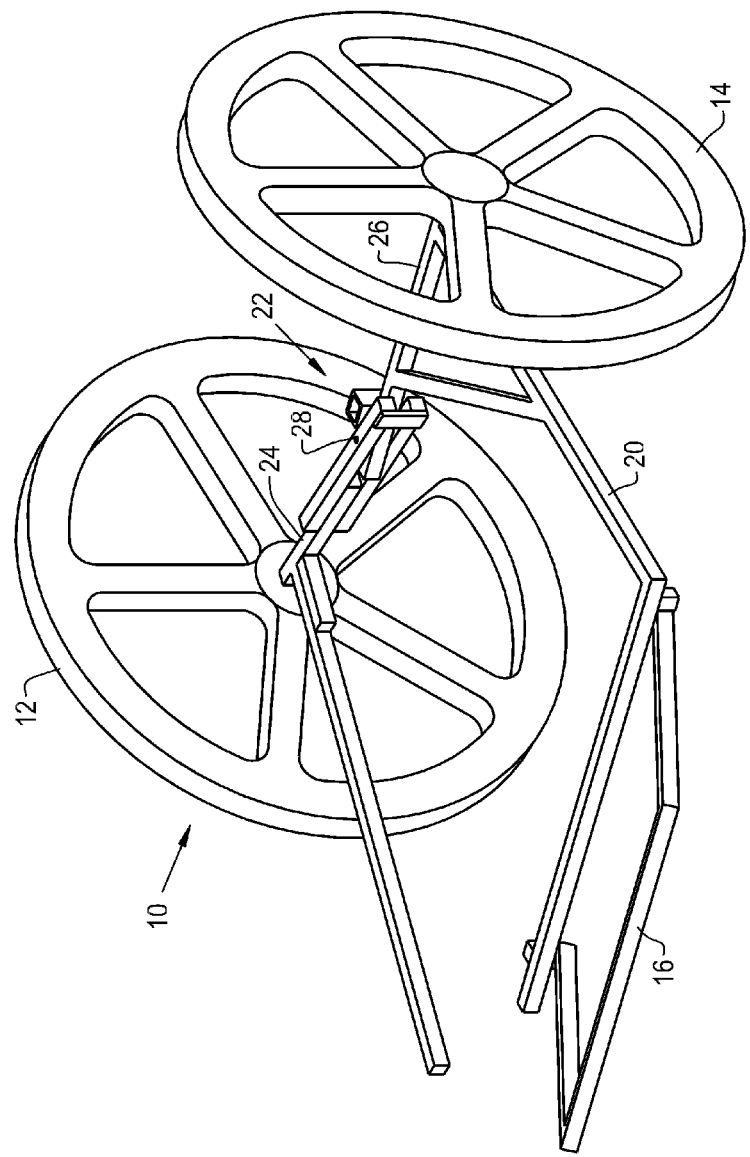
FIG. 4 is a perspective view of the game cart of FIGS. 1-3 with the axle pivoting.
Figure 5:
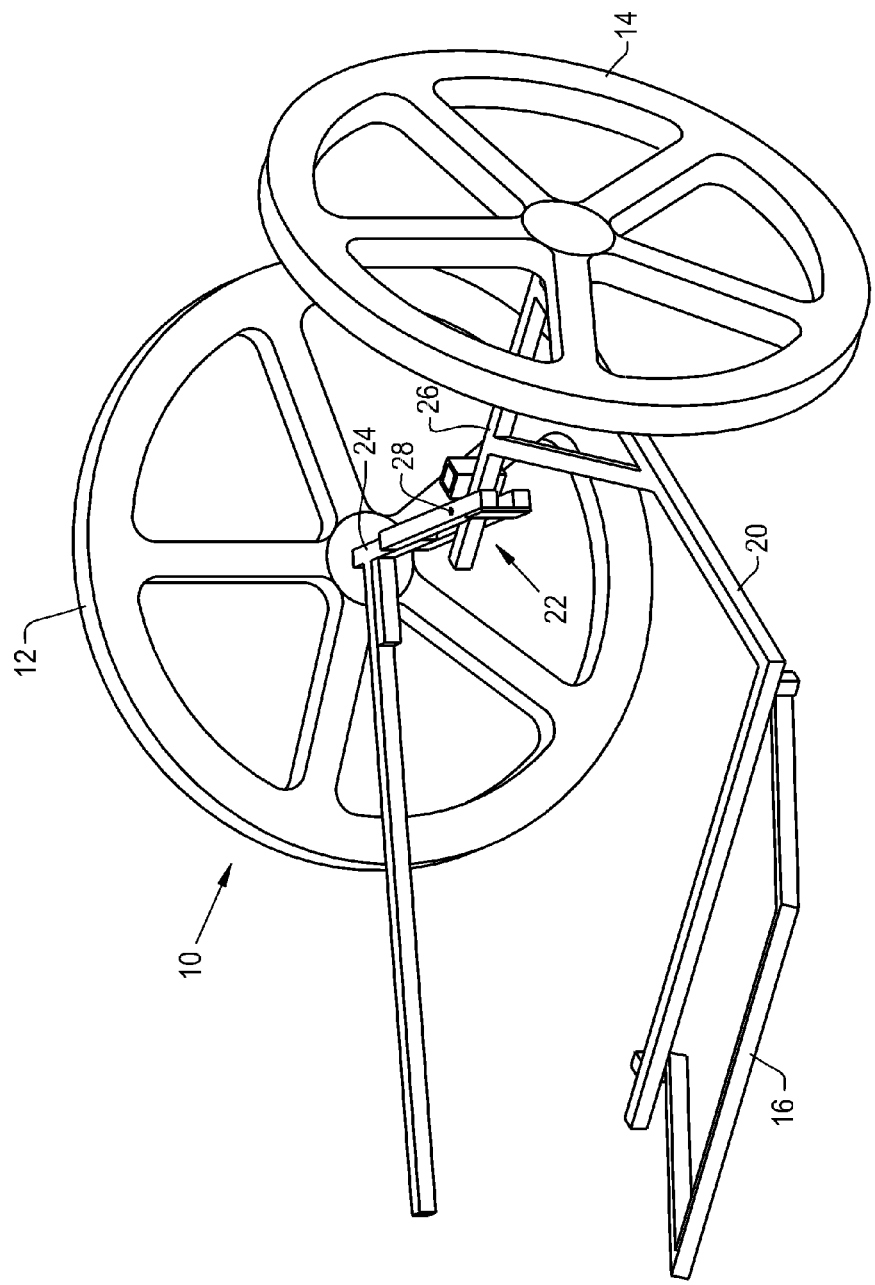
FIG. 5 is another perspective view of the game cart of FIGS. 1-4 pivoting to a further extent.

When viewed in sequence, FIGS. 3-6 illustrate the transformation of cart 10 into seat 10. In FIG. 4 a latch device (not shown) proximate to a portion of handle 16 is released allowing axle member 24 to pivot about pivot point 28 relative to axle member 26. FIG. 5 further illustrates the approach of wheel 12 toward wheel 14. In FIGS. 6 and 7, wheel 14 is shown on the ground with wheel 12 now able to move on top of the side of wheel 14 as frame 20, and wheel 12 turn about the axis of axle member 26.

FIG. 7 illustrates the placement of seat 18 onto a portion of axle member 24. It is also contemplated that a framework portion can stay with axle portion 24 for the supporting of seat 18. Shooting rest 30 is placed into a portion of frame 20, which may be of a square tubular form, thereby providing an adjustable height rest for a camera, a firearm, a crossbow or other hunting device.

As briefly mentioned, in the cart form the cart 10 can be pulled around with the load of equipment and/or game being balanced over axle system 22 to reduce the amount of effort to move the load. Pulling cart 10 is made easy with the use of large wheels, which by way of example, may be approximately 26" dia. to allow for high ground clearance and reduce the negative effect of uneven terrain. Other diameters are also contemplated, as well as various wheel profiles. Cart 10 can be pulled to the hunt site while hauling all of your hunting gear. After you are at the hunt site the cart can be converted into the rotating and stable hunting seat/system of FIG. 7.

To transform cart 10 you first remove the "seat" 18 or the bed 18 of cart 10, by unfastening and lifting up and out of the "mounting sleeve". Roll cart 10 onto its side with the base wheel 14 lying flat on the ground. Unfasten one side of the cart frame allowing you to fold the cart in two, pivoting at mid axle 28. Open all the way until wheel 12 is now in contact with the side of the base wheel 14. Wheel 12 can now roll around the perimeter of the base wheel 14 on a smooth and flat surface. Place the seat 18 on top of the folded axle on the "mounting post". Fold the pull handle 16 toward the seat position. The part of the frame that is proximate to wheel 12 is now vertical and pointing into the sky is adjustable and telescoping to allow for use of a hunting blind. The shooting rest 30 has a "V" shape and is adjustable and telescoping to allow for a rest for hunting or picture taking. When sitting on seat 18 the hunter can position his/her legs on each side of pull handle 16 with the "V" in front for shooting support.

You can now rotate to any angle quietly and smoothly. You also will always have a shooting rest at any angle you rotate to. You can also hang a hunting pack on the pull handle to allow for easy access to all your hunting gear while hunting. Although not shown, it is also contemplated that wheel 12 may traverse the ground rather than the side of wheel 14 when in the seating orientation, but the present invention contributes to a lower noise level hunt with wheel 12 traveling on the side of wheel 14.

After the hunt reverse the steps to convert seat 10 back into cart 10 and haul your game and equipment back to your vehicle or to home.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A convertible game cart, comprising:
   a first wheel rotatable about a first axis;
   a second wheel rotatable about a second axis; and
   a pivoting mechanism coupling said first wheel and said second wheel, said pivoting mechanism being configured to pivot said first wheel relative to said second wheel from a first orientation with said first axis and said second axis being generally parallel to a second orientation with said first axis and said second axis being generally perpendicular, said first axis being generally vertical and said second axis being generally horizontal when the game cart is in said second orientation.

2. The convertible game cart of claim 1, further comprising a support mechanism serving as a platform in said first orientation and as a seat in said second orientation.

3. The convertible game cart of claim 2, further comprising a pull handle coupled to said pivoting mechanism.

4. The convertible game cart of claim 3, further comprising a frame connected to said pivoting mechanism, said pull handle being pivotally connected to said frame.

5. The convertible game cart of claim 4, further comprising a shooting rest extending from a portion of said frame when the game cart is in said second orientation.

6. The convertible game cart of claim 5, wherein said shooting rest is adjustable in height.

7. The convertible game cart of claim 2, wherein said support mechanism is foldable.

8. The convertible game cart of claim 1, wherein said second wheel is positioned to roll on top of a portion of said first wheel when the game cart is in said second orientation.

9. A convertible game cart, comprising:
   a first wheel rotatable about a first axis;
   a second wheel rotatable about a second axis;
   a pivoting mechanism coupling said first wheel and said second wheel, said pivoting mechanism being configured to pivot said first wheel relative to said second wheel from a first orientation with said first axis and said second axis being generally parallel to a second orientation with said first axis and said second axis being generally perpendicular;
   a support mechanism serving as a platform in said first orientation and as a seat in said second orientation;
   a pull handle coupled to said pivoting mechanism; and
   a frame connected to said pivoting mechanism, said pull handle being pivotally connected to said frame, said pull handle being configured to be folded toward said first axis and said second axis when the game cart is in said second orientation.

10. A combination cart and hunting seat, comprising:
    a first wheel rotatable about a first axis;
    a second wheel rotatable about a second axis; and
    a pivoting seat supporting mechanism coupling said first wheel and said second wheel, said pivoting seat supporting mechanism being configured to pivot said first wheel relative to said second wheel from a first orientation with said first axis and said second axis being generally parallel to a second orientation with said first axis and said second axis being generally perpendicular.

11. The combination cart and hunting seat of claim 10, further comprising a support serving as a platform in said first orientation and as a seat in said second orientation.

12. The combination cart and hunting seat of claim 11, further comprising a pull handle coupled to said pivoting seat supporting mechanism.

13. The combination cart and hunting seat of claim 12, further comprising a frame connected to said pivoting seat supporting mechanism, said pull handle being pivotally connected to said frame.

14. The combination cart and hunting seat of claim 13, wherein said pull handle is configured to be folded toward said first axis and said second axis when the combination is in said second orientation.

15. The combination cart and hunting seat of claim 13, further comprising a shooting rest extending from a portion of said frame when the combination is in said second orientation.

16. The combination cart and hunting seat of claim 15, wherein said shooting rest is adjustable in height.

17. The combination cart and hunting seat of claim 11, wherein said support is foldable.

18. The combination cart and hunting seat of claim 10, wherein said first axis is generally vertical and said second axis is generally horizontal when the combination is in said second orientation.

19. The combination cart and hunting seat of claim 10, wherein said second wheel is positioned to roll on top of a portion of said first wheel when the combination is in said second orientation.

\* \* \* \* \*